US008797884B2

(12) United States Patent
Deb et al.

(10) Patent No.: US 8,797,884 B2
(45) Date of Patent: Aug. 5, 2014

(54) NETWORK COMMUNICATION APPARATUS, SYSTEM AND METHOD

(75) Inventors: Abhijit Kumar Deb, Eindhoven (NL); Hubertus Gerardus Hendrikus Vermeulen, Eindhoven (NL); Sujan Pandey, Eindhoven (NL)

(73) Assignee: NXP B.V., Eindhoven (NL)

( * ) Notice: Subject to any disclaimer, the term of this patent is extended or adjusted under 35 U.S.C. 154(b) by 170 days.

(21) Appl. No.: 13/535,078

(22) Filed: Jun. 27, 2012

(65) Prior Publication Data
US 2014/0003223 A1    Jan. 2, 2014

(51) Int. Cl.
*H04L 1/00*    (2006.01)
*H04L 12/26*    (2006.01)

(52) U.S. Cl.
CPC .................................. *H04L 43/0823* (2013.01)
USPC .......................................... 370/244; 370/216

(58) Field of Classification Search
CPC .................................................. H04L 43/0823
USPC .............. 370/216, 242, 244, 401, 395.4, 389, 370/392
See application file for complete search history.

(56) References Cited

U.S. PATENT DOCUMENTS

| | | | |
|---|---|---|---|
| 5,940,440 A | 8/1999 | Werner et al. | |
| 6,633,606 B1 | 10/2003 | Oh | |
| 7,170,931 B2 | 1/2007 | Greiss et al. | |
| 2002/0027953 A1 | 3/2002 | Hwang et al. | |
| 2003/0109270 A1* | 6/2003 | Shorty | 455/517 |
| 2003/0192003 A1* | 10/2003 | Das et al. | 714/758 |
| 2009/0046593 A1* | 2/2009 | Ptasinski et al. | 370/252 |
| 2009/0046732 A1* | 2/2009 | Pratt et al. | 370/406 |
| 2010/0202347 A1* | 8/2010 | Sridhara et al. | 370/328 |
| 2011/0093759 A1* | 4/2011 | Song et al. | 714/756 |
| 2012/0124427 A1 | 5/2012 | Haug | |

FOREIGN PATENT DOCUMENTS

| | | |
|---|---|---|
| WO | WO2004/100455 | 11/2004 |
| WO | WO2008/119922 | 10/2008 |

OTHER PUBLICATIONS

European Search Report in a counterpart case.
Sato, "A Method of Self-Recovering Equalization for Multilevel Amplitude-Modulation Systems", IEEE Transactions on Communications, Jun. 1975, p. 679-682.
Godard, "Self-Recovering Equalization and Carrier Tracking in Two-Dimensional Data Communication Systems", IEEE Transactions on Communications, vol. Com-28, No. 11, Nov. 1980, pg. 1867-1875.
FlexRay Communications System Preliminary Central Bus Guardian Specification Version 2.0.9, Dec. 15, 2005, pp. 1-38.
FlexRay Communications System Protocol Specification Version 2.1 Revision E, Consortium internal release, Jun. 5, 2009, pp. 1-318.
FlexRay Communications System Protocol Specification Version 3.0.1, FlexRay Consortium, Oct. 2010, pp. 1-341.

* cited by examiner

*Primary Examiner* — Brian D Nguyen (57) ABSTRACT

Aspects of the present invention are directed to data communications on a wired communication network including a plurality of network branches, each having a common communication link and a plurality of network devices connected to the network branches. Communications received from the network devices during different time slots are assessed as being error-indicative or not error-indicative. Based upon the assessment, communications received during time slots within a cycle not assessed as being error-indicative are forwarded, and communications received during time slots within the cycle assessed as being error-indicative are not forwarded.

20 Claims, 3 Drawing Sheets

NETWORK COMMUNICATION APPARATUS, SYSTEM AND METHOD

Aspects of various embodiments of the present invention are directed to network communications, such as time-based communications.

In various communications networks, different nodes of a distributed system exchange data through a centralized component. If one of the nodes develops an error, that error may be communicated over the network. Spreading such an error is generally undesirable, particularly on networks such as automotive networks in which safety type components communicate.

One type of communication approach that has been used in certain applications includes time-based communication in which a data stream is segmented into frames for sharing a communication medium. When errors are detected on a particular branch, further dissemination of the errors can be mitigated by ignoring or cutting off the particular branch with respect to communications. However, ignoring or cutting off the branch can undesirably limit communications therein.

These and other matters have presented challenges to data communications for a variety of applications.

Various example embodiments are directed to communication circuits, their implementation, and methods for communication.

According to an example embodiment, an apparatus includes a wired network including a plurality of network branches each having a common communication link, a plurality of network devices connected to the network branches, a plurality of time-slot communication schedules respectively stored and accessible by each of the network devices, and a central communication circuit. The plurality of time-slot communication schedules designate time slots during which each network device is assigned to communicate over an associated one of the plurality of network branches. The central communication circuit includes a central-communication schedule, stored and accessible by the central communication circuit, data-coupling circuitry for communicatively coupling data between the central communication circuit and each of the plurality of network devices through respective ones of the plurality of network branches, and data-logic circuitry. The data-logic circuitry receives communications from the plurality of network devices each connected to one of the network branches using, for each communication, a time slot assigned for the communication in the central-communication schedule. Each received communication is assessed as being error-indicative or not error-indicative, irrespective of an interpretation of any payload carried by the received data. Based on the assessment, either the communication is forwarded to one or more of the other network devices, or dissemination of further communications, which would use the time slot associated with the received communication assessed as being error-indicative is blocked while permitting communication using other time slots on the branch common to the error-indicative time slot.

In various embodiments, the data-logic circuitry assesses received communications as being error-indicative or not error-indicative based upon at least one of: a number of errors occurring on the time slot in which the communication is received, a type of error occurring, and a number of errors received from said one of the plurality of network devices on different time slots assigned to the said one of the network devices via the central-communication schedule. Based on this assessment, the time slot on which the communication is received is designated as being in error, and future communications received on the time slot are not forwarded (e.g., blocked or ignored).

Various embodiments are directed to an apparatus implemented as a central communication node, as consistent with the above example. The central communication node functions to forward communications received on respective branches to circuits on other branches according to a central-communication schedule, and does not forward data received on time slots designated as faulty.

Other embodiments are directed to methods for communicating data over a wired communication network, including a plurality of network branches each having a common communication link and a plurality of network devices connected to the network branches. A plurality of time-slot communication schedules are communicated for storage and access by each of the network devices; the plurality of time-slot communication schedules designating time slots assigned to each network device for communication over an associated one of the plurality of network branches. A central-communication schedule is also stored, and data is coupled between each of the plurality of network devices through respective ones of the plurality of network branches according to the central communication schedule. A communication is received from one of the plurality of network devices connected to one of the network branches using a time slot assigned for the communication in the central-communication schedule, and the received communication is assessed as being error-indicative or not error-indicative irrespective of an interpretation of any content carried by the received data. The received communication is forwarded to the other network devices, or dissemination of further communications which would use the time slot associated with the received communication assessed as being error-indicative is blocked while permitting communication using other time slots on the branch common to the error-indicative time slot.

The above discussion/summary is not intended to describe each embodiment or every implementation of the present disclosure. The figures and detailed description that follow also exemplify various embodiments.

Various example embodiments may be more completely understood in consideration of the following detailed description in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention including aspects defined in the claims. In addition, the term "example" as used throughout this application is only by way of illustration, and not limitation.

Aspects of the present invention are believed to be applicable to a variety of different types of devices, systems and arrangements involving time-based data communications between different network branches, with some or all of the branches having two or more components communicating thereupon. While the present invention is not necessarily so limited, various aspects of the invention may be appreciated through a discussion of examples using this context.

Various example embodiments are directed to network communication apparatuses, systems and methods in which communications are restricted with network branches during time slots pertaining to erroneous communications over the network branches. Based on errors occurring during certain time slots within a communication cycle, communication with the branch from which the errors emanate is restricted with respect to one or more time slots during which the errors occur, while communications with the branch are allowed during other time slots. This approach may involve, for example, forwarding data from such a branch during all time slots except those being designated as time slots during which erroneous data has been transmitted. Certain embodiments are also directed to discovering such errors, and in some implementations involve monitoring errors over time and designating time slots as error-indicative based upon the monitored errors.

A more particular example embodiment is directed to an apparatus including a central network component that confines errors within a branch in which the error has originated, and within a time slot during which the branch accesses the central network component. As consistent with the above discussion, this confinement may involve forwarding data from such a branch during time slots not designated as being error-indicative, while not forwarding data from one or more time slots designated as error-indicative. This approach facilitates continued communications with non-faulty nodes on a branch in which the fault has originated, while mitigating communications from faulty nodes. This communication approach can be effected without knowledge or identification of a particular node from which the faulty communication is provided, using an understanding that each node communicates during a designated time slot or slots. In some implementations, the central network component collects and analyzes error statistics to determine whether time slots are to be designated as being error-indicative, such as by using a multi-dimensional table as discussed further herein.

Various embodiments are directed to time-based communications involving a time division multiple access (TDMA) technique, in which a data forwarding schedule is provided to a central component that uses the schedule to forward frames between one or more network branches coupled to the central component. Frames that do not comply with certain protocols can be confined to an originating branch, using one or more approaches such as discussed herein. In one example, the central component monitors incoming frames against different rules set by a communication protocol stored at the central component. If any frame violates the rules, that frame is designated as having an error, which is used by the central component in determining whether or not to forward data from certain channels, for such time frames. This forwarding control can be effected, for example, by monitoring such frames over time and, when errors reach a threshold (e.g., a total number of errors on a particular time slot, or an error rate), the time slot can be designated as error-indicative for every cycle.

In certain embodiments, error-based communications as discussed herein are carried out using in-vehicle networks (IVNs), such as for automobiles, trains, airplanes and other vehicles. The data frames of some protocols such as the FlexRay protocol do not contain the address of the sender node. Various embodiments are directed to implementations involving such a protocol, in which the time frames during which data is communicated are monitored for errors and controlled according to the time frame and communication branch, independent from any knowledge of which node is communicating on each time frame.

In other example embodiments, a similar approach is effected using source device address information to selectively permit or restrict communications from a particular communication branch, based upon the source while also independently selectively permitting or restricting communications from another source device on the same branch. This approach is carried out in a manner similar to the time-slot based communications discussed above, in which time slots are monitored for error detection. For network devices designated as generating error-indicative data, the central communication circuit blocks dissemination of communications from the network devices, while permitting communications with other network devices on the branch (e.g., by not forwarding such communications that are blocked).

In some implementations, one or more embodiments as discussed herein are implemented with FlexRay protocol applications specifically targeting the communication needs of the safety critical in-vehicle networks that use TDMA to exchange data during static segments, via a central component (e.g., a Central Bus Guardian) that monitors incoming frames against different rules. Such rules may include, for example, identifying as erroneous: 1) a data frame that appears from a branch during a time slot when the branch is not supposed to transmit; 2) a data frame that appears from a branch too late within its scheduled time slot such that the frame may cause a slot boundary violation; and 3) a data frame that appears from a branch with incorrect header information or checksum.

For general information regarding communications protocols, and for specific information regarding communication protocols that may be implemented in connection with one or more example embodiments, reference may be made to the "FlexRay Communications System Protocol Specification," ver 3.0; and to the "FlexRay Communications System Preliminary Central Bus Guardian Specification," ver 2.0.9, both available from the FlexRay consortium and fully incorporated herein by reference.

The various example embodiments as discussed herein are implemented with different systems, on different platforms, and with different environments (e.g., automotive, manufacturing and others) to suit a variety of applications. One such application involves a branch-type active star device TJA1085 available from NXP Semiconductors of Eindhoven, The Netherlands. Accordingly, various embodiments are directed to implementation with such a device in an automotive network.

Another more particular example embodiment is directed to an apparatus having a wired network including a plurality of network branches each having a common communication link, a plurality of network devices connected to the network branches, a plurality of time-slot communication schedules respectively stored and accessible by each of the network devices, and a central communication circuit. One or more of the network devices are connected to each branch, with at least one of the branches having two or more such devices connected thereto, in which communications with each device can be separately restricted while permitting communication over the branch with the other device connected to the branch.

The plurality of time-slot communication schedules designate time slots during which each network device is assigned to communicate over an associated one of the plurality of network branches. The central communication circuit includes a central-communication schedule, stored and accessible by the central communication circuit, data-coupling circuitry and data-logic circuitry. The data-coupling circuitry communicatively couples data between the central communication circuit and each of the plurality of network devices through respective ones of the plurality of network branches. The data-logic circuitry operates to receive a communication from one of the plurality of network devices connected to one of the network branches using a time slot assigned for the communication in the central-communication schedule, and to assess the received communication as being error-indicative or not error-indicative irrespective of an interpretation of any content carried by the received data. In response to the assessment, the data-logic circuitry forwards the received communications to the other network devices, or blocks dissemination of further communications, which would use the time slot associated with the received communication assessed as being error-indicative while permitting communication using other time slots on the branch common to the error-indicative time slot. Blocking dissemination may, for example, include actively not forwarding received communications according to the stored central-communication schedule.

Figure 1:
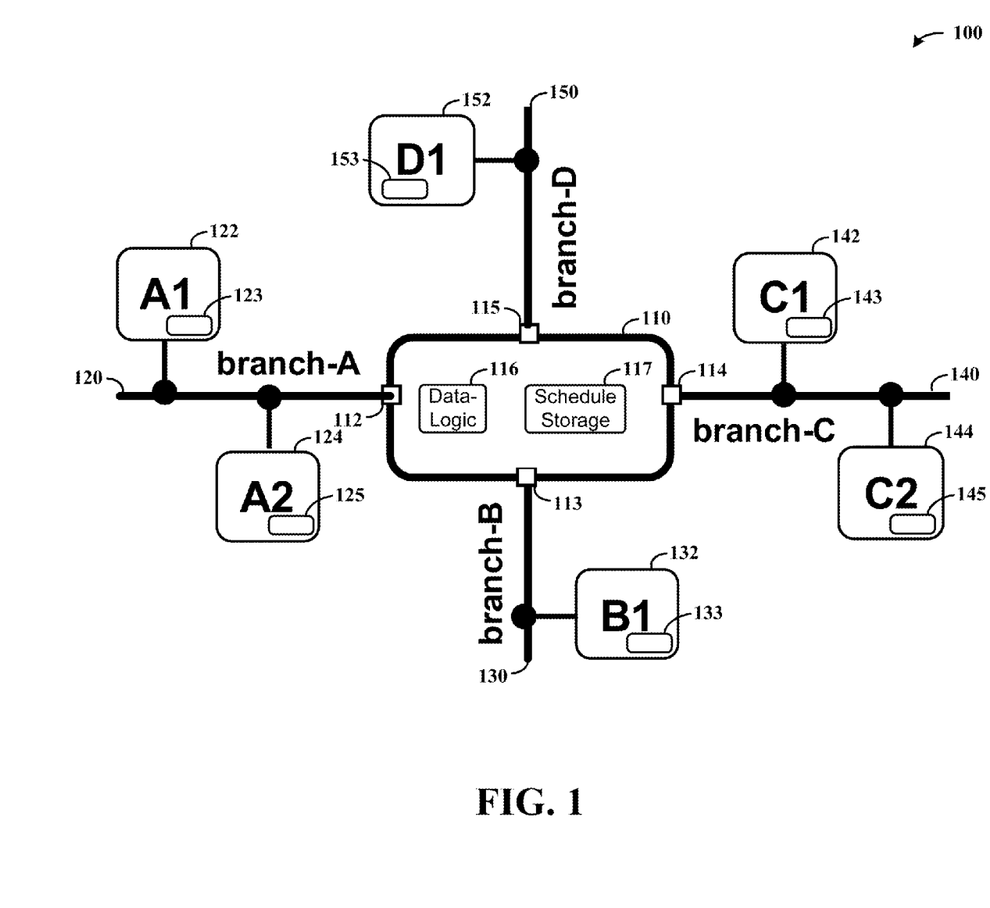
FIG. 1 shows a communications circuit and network, in accordance with one or more example embodiments of the present invention.

Turning now to the figures, FIG. 1 shows a communications circuit and network 100, in accordance with one or more example embodiments of the present invention. The network 100 includes a central network component 110 (e.g., a central communication circuit, or gateway) shown by way of example as having four branches 120, 130, 140 and 150, with each branch including one or more network communication devices. By way of example, branches 120 and 140 are shown each having two network devices, with branch 120 having devices 122 and 124, and branch 140 having devices 142 and 144. Branches 130 and 150 are shown each respectively having single network devices 132 and 152. The respective number of branches and devices per branch are shown herein by way of example, with the understanding that various embodiments are directed to fewer or more branches, with fewer or more network devices connected thereto and in which at least one of the branches is connected to two devices.

Each of the network devices transmits and receives data frames on the branch to which the network device is connected. The central network component 110 forwards data frames from each branch in a number of different ways. For example, it may not forward a frame to any other branch, it may forward a frame to another branch, it may forward a frame to multiple branches, or it may forward a frame to all other branches. This forwarding is carried out based upon error-indicative data that identifies one or both of time frames during which error-indicative data is received from the respective network branches, and an identification of the network device sending the error-indicative data, using an approach such as discussed herein above. For instance, if a time slot during which network device 122 communicates is detected on network branch 120 (e.g., over time, representing a statistical indication that the time slot is faulty), the central network component 110 does not forward data received over network branch 120 during that time slot, while forwarding data received during other time slots on network branch 120 (e.g., from network device 124). This selective forwarding can be carried out independently from any knowledge of which network device is communicating error-indicative data, or of a number of network devices on the branch. In addition, data received during time slots assessed/designated as not being error-indicative can be automatically forwarded (e.g., according to a central-communication schedule).

In some embodiments, the central network component 110 forwards data using a central communication schedule as discussed herein, using data-logic circuitry 116 to forward the data based on the central communication schedule as stored in schedule storage 117. Each of the network devices also stores time-slot communication schedule data, as represented at 123, 125, 133, 143, 145 and 153.

Figure 2:
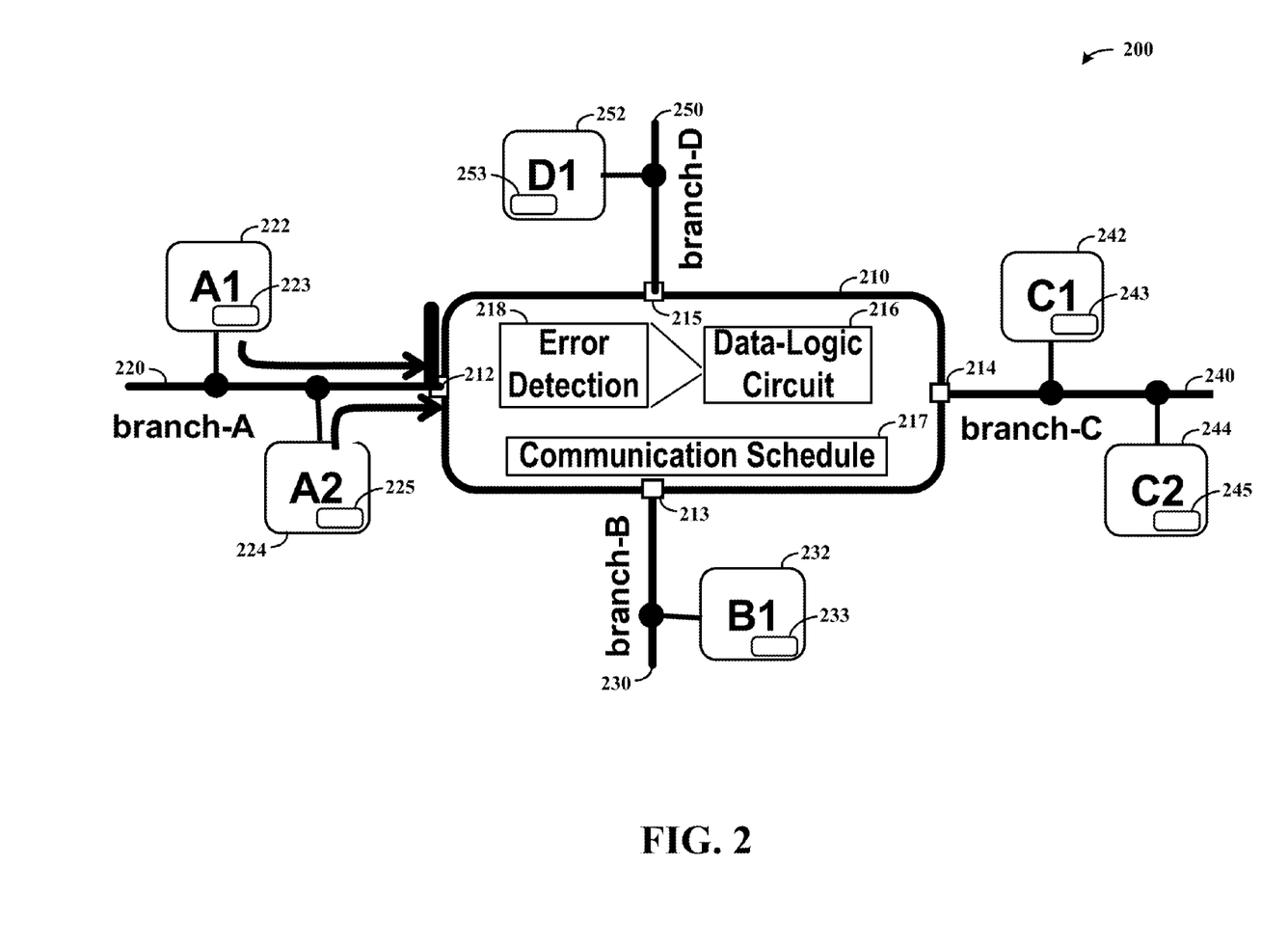
FIG. 2 shows another communication circuit and network, in accordance with one or more example embodiments of the present invention.

FIG. 2 shows another communication circuit and network 200, as may be implemented in accordance with one or more example embodiments of the present invention. The circuit and network 200 includes a central communication circuit 210 and can be implemented in a manner that is similar to that as shown in FIG. 1, and is accordingly labeled with similar reference numerals (e.g., central communication circuit 210 is labeled similarly to circuit 110). The network 200 is shown by way of example as having four branches 220, 230, 240 and 250 (e.g., wire-based pathways), with each branch including one or more network communication devices. By way of example, branches 220 and 240 are shown each having two network devices, with branch 220 having devices 222 and 224, and branch 240 having devices 242 and 244. Branches 230 and 250 are shown each respectively having single network devices 232 and 252. Each network device includes a data storage component that stores time-slot communication schedule data respectively at 223, 225, 233, 243, 245 and 253. The central communication circuit 210 includes a data-logic circuit 216 that forwards data according to both a communication schedule 217, and an output/data provided by error detection circuit 218.

The central communication circuit 210 selectively does not forward (e.g., blocks) data received on respective branches during time slots indicated to be faulty or error-indicative using, for example, an approach as discussed above. Referring to network branch 220 by way of example, when time slots during which network device 222 communicates are detected as indicative of an error, further communications on that time slot during subsequent cycles are blocked, while permitting communications on other time slots from network device 224, as exemplified by way of example by arrows. In one example, the data-logic circuitry forwards received communications to the other network devices during time slots not assessed as being error-indicative, and does not forward/blocks dissemination of communications received during time slots assessed as being error-indicative. For instance, the data-logic circuitry may assess a received communication as being error-indicative or not error-indicative based upon one or more of a number of errors occurring on the time slot in which the communication is received, a type of error occurring, and a number of errors received from said one of the plurality of network devices on different time slots assigned to the said one of the network devices via the central-communication schedule.

Referring again to FIGS. 1 and 2, various embodiments are directed to one or more components of the system as shown. For example, some embodiments are directed to a central communication circuit that operates in accordance with the central circuits as shown in FIG. 1 or 2. Such a circuit is implemented, for example, in automotive type systems with a plurality of network branches connected to automotive components, such as to engine control systems, throttle systems, braking systems and others.

A variety of different types of error detection may be implemented in accordance with the various embodiments described herein, such as those shown in FIGS. 1 and 2. In one particular embodiment, the FlexRay protocol uses a TDMA technique to transfer data during the static segment. Error statistics are collected for the static segment slots of the FlexRay communication cycles. These statistics are collected and stored over time (e.g., at the central communication circuit 210 in FIG. 2), such as in a table with rows corresponding to respective branches and columns corresponding to time slots within a communication cycle and the data being augmented each time an error is detected. Initially, all cells are set to zero, and as values are incremented, the values are used to determine whether a network device is faulty (e.g., based upon a total number of errors, a repeated error and/or a rate of error). Based on such error detection, a central communication circuit such as 210 selectively forwards frames received from each branch to ensure that data received during time slots indicated as faulty is not forwarded.

Various embodiments are directed to enhanced error monitoring, in which a type of error is also tracked. This information may, for example, also be stored in an error correction table (e.g., with the communication schedule 217 in FIG. 2). In certain implementations, the central communication circuit 210 implements such an approach and also uses a type of error information in determining whether or not to stop forwarding data received on a particular branch during a particular time slot (e.g., by processing algorithm-type data indicative of both error frequency and type). This additional error information can also be stored for later use in diagnostics.

In more particular example embodiments, a time-slot communication schedule is implemented at one or more network devices, such as shown in FIGS. 1 and 2, which dictates that a particular device communicates during different time slots for different communication cycles. Accordingly, the central communication circuit 210 (using FIG. 2 by way of example) operates in such an embodiment to utilize a communication schedule to identify and track errors occurring during different time slots for different cycles, but emanating from the same network device. Such an approach may be implemented, for example, when slot multiplexing techniques such as those described in the FlexRay standard cited herein are employed. Table 1 shows an approach to tracking such communications (and, if present, errors). The number of columns pertains to the number of repetitive communication cycles present in the schedule. Each cell contains information about one branch and all the slots of the communication cycle.

TABLE 1

|  | Communication cycle#1 | Communication cycle#2 | Communication ... cycle#m |
|---|---|---|---|
| Branch-A | Slot#1, slot#2, ... slot#s | Slot#1, slot#2, ... slot#s | ... Slot#1, slot#2, ... slot#s |
| Branch-B | Slot#1, slot#2, ... slot#s | Slot#1, slot#2, ... slot#s | ... Slot#1, slot#2, ... slot#s |
| ... | ... | ... | ...... |
| Branch-N | Slot#1, slot#2, ... slot#s | Slot#1, slot#2, ... slot#s | ... Slot#1, slot#2, ... slot#s |

Various embodiments are directed to an apparatus, which may include one or more components as shown in and described in connection with FIGS. 1 and 2. Such an apparatus includes a central communication circuit (e.g., 210), data-coupling circuitry (e.g., 212-215 and other circuit pathways connected thereto), and data-logic circuitry (e.g., 216) that works to facilitate communications on branches having two or more devices connected thereto (e.g., branch 220). In various implementations, a common communication link in each branch is a common wired-based pathway to which the network devices in each branch are directly connected, with each network device assigned to communicate (via a time-slot communication schedule) on one or more time slots that are different than time slots during which the other communication device communicates on.

The central communication circuit may communicate using a variety of different links to the respective branches, to suit particular applications. In some embodiments, the central communication circuit includes a plurality of input/output ports connected to the respective network branches. In certain implementations, the input/output ports include a communication pathway designated for receiving configuration information used to configure the central communication circuit for time-slot based communication over the respective network branches.

The network devices that communicate via the central communication circuit are implemented in different manners, to suit different applications. In some embodiments, the network devices include a circuit including a microcontroller and an input/output port through which the microcontroller communicates with one of a plurality of common wired-based pathways that respectively make up the network branches. The microcontroller uses the time-slot schedule to communicate data (e.g., when functioning properly), with different network devices on each branch using different time slots (according to the time slot schedule) during each communication cycle, to permit communications on the network branch.

Figure 3:
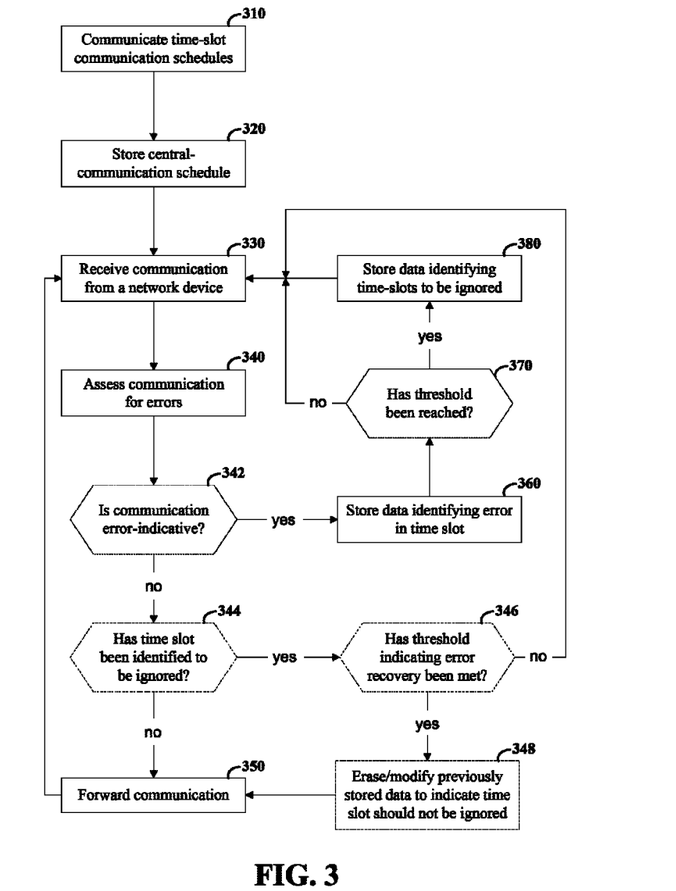
FIG. 3 shows a flow diagram in accordance with another example embodiment of the present invention.

FIG. 3 shows a flow diagram in accordance with another example embodiment of the present invention. The flow diagram shown in FIG. 3 is implemented in a wired communication network including a plurality of network branches, each having a common communication link and a plurality of network devices connected to the network branches. At block 310, a plurality of time-slot communication schedules are communicated for storage and access by each of the network devices. These time-slot communication schedules designate time slots assigned to each network device for communication over an associated one of the plurality of network branches. At block 320, a central-communication schedule is also stored, and data is communicatively coupled between each of the plurality of network devices through respective ones of the plurality of network branches, according to the central-communication schedule.

At block 330, a communication is received from one of the plurality of network devices connected to one of the network branches using a time slot assigned for the communication in the central-communication schedule. This received communication is assessed as being error-indicative or not error-indicative at block 340, irrespective of an interpretation of the payload carried by the received data. If the communication is assessed as being not error-indicative at block 340, the communication is forwarded to one or more other network devices via one or more branches at block 350, according to the central-communication schedule.

If the communication is assessed as being error-indicative at block 340, the communication is not forwarded and data is stored to designate the time slot during which the communication has been received as being error-indicative at block 360. If a threshold at which a time slot can be identified as being error-indicative has been reached at block 370, the time slot is designated as being in error at block 380, and data is stored to identify the time slot as such. If the threshold has not been reached, or after data is stored at block 380, the process continues at block 330 for subsequent time slots.

In some embodiments, further communications received during the identified time slot are monitored to determine whether an error-indicative condition has subsided. In these embodiments, represented by dashed-line blocks in FIG. 3, a communication that is not identified as error indicative at block 342 is further evaluated at block 344 to determine whether the time slot in which the communication is received has previously been identified as a time slot to be ignored (as stored at block 380). If the time slot had not been so previously identified, the process continues at block 350 as above. If the time slot has been previously identified as being error-indicative, and if a threshold number of error-free frames has been received at block 346, the previously stored data indicating the time slot as error indicative is adjusted at block 348 such that the time slot is no longer ignored, and the process continues at block 350. If the time slot has been previously identified as being error-indicative but a threshold number of error-free frames has not been received at block 346, the time slot is ignored (e.g., data is not forwarded) and the process continues at block 330.

In addition to and/or in accordance with the above, various example embodiments are directed to network communication apparatuses, systems and methods in which a communication schedule is assessed for errors at one or more network nodes, based upon stored protocol data thereat (e.g., as may be implemented with one or all components in FIG. 2). This approach may involve, for example, evaluating received configuration data specifying a communication schedule by which data is to be communicated, against stored protocol data at a network node at which the schedule is received, and therein ensuring that the schedule complies with the protocol prior to implementation. This may, for example, facilitate the installation of a new communication schedule in the field, as may be applicable to automotive networks in which a communication schedule is updated in a user's vehicle after the manufacture of the vehicle (e.g., at an automotive repair shop, or as downloaded at a user's vehicle in response to an update).

In some embodiments, a central network component as discussed herein assesses communications received along various network branches from devices connected to the branches. When a communication is assessed to be error-indicative, the central network component does not forward the communication to other branches and also drives the originating branch from which the communication is received to ensure that other network devices on the same branch do not accept/process the communication. This approach can be carried out, for example, to ensure that those devices on the originating branch that may receive the communication in an error-free condition do not update, accept and/or process the communication. With respect to automotive applications, this approach can ensure that safety-related communications, such as those involved in communication from a braking system, are distributed consistently to different network components.

Still another embodiment is directed to an apparatus employing two or more of the above referenced-aspects together. In one implementation, such an apparatus operates to evaluate received communications schedules against protocol data, and to also drive against branches via which communications are received according to a validated communication schedule, when an error-indicative communication is received on the branch. In another implementation, such an apparatus operates to evaluate received communications schedules against protocol data, and to also evaluate time slots at which communications are received for errors, based on a validated communication schedule; when a time slot is determined to be in error, communications received over a network branch and on the time slot are not forwarded/processed while communications received on the network branch during different time slots are forwarded/processed. In another implementation, an apparatus operates to drive against branches when an error-indicative communication is received on the branch, and also evaluates time slots at which communications are received over the branch for errors and actively ignores (e.g., does not forward and/or process) data received during time slots indicative as having an error.

Based upon the above discussion and illustrations, those skilled in the art will readily recognize that various modifications and changes may be made to the present invention without strictly following the exemplary embodiments and applications illustrated and described herein. For example, various types of error detection may be implemented in accordance with embodiments as discussed herein, with time-slot based mitigation of the dissemination of communications designated as being error-indicative. In addition, one or more components of the various apparatuses and systems described herein may be implemented separately or together, in accordance with one or more example embodiments. Such modifications do not depart from the true spirit and scope of the present invention, including that set forth in the following claims.

What is claimed is:

1. An apparatus comprising:
a wired network including a plurality of network branches each having a common communication link;
a plurality of network devices connected to the network branches;
a plurality of time-slot communication schedules respectively stored and accessible by each of the network devices, the plurality of time-slot communication schedules designating time slots during which each network device is assigned to communicate over an associated one of the plurality of network branches;
a central communication circuit having
a central-communication schedule stored and accessible by the central communication circuit,
data-coupling circuitry configured and arranged for communicatively coupling data between the central communication circuit and each of the plurality of network devices through respective ones of the plurality of network branches, and
data-logic circuitry configured and arranged to
receive a communication from one of the plurality of network devices connected to one of the network branches using a time slot assigned for the communication in the central-communication schedule,
assess the received communication as being error-indicative or not error-indicative irrespective of an interpretation of payload carried by a received data, and
in response thereto, either forward the received communications to the other network devices or block dissemination of further communications, which would use the time slot associated with the received communication assessed as being error-indicative while permitting communication using other time slots on the branch common to the error-indicative time slot.

2. The apparatus of claim 1, wherein the common communication link in each branch is a common wire-based pathway to which the network devices in each branch are directly connected, said one of the network branches having first and second ones of the network devices, the first one of the network devices being said one of the plurality of network devices from which the communication is received, and the second network device being another of the plurality of network devices assigned to communicate using a time slot that is different than the time slot used by said one of the plurality of network devices from which the communication is received.

3. The apparatus of claim 1, wherein the central communication circuit includes a plurality of input/output ports connected to and for communicating over the respective network branches, and wherein the plurality input/output ports includes a communication pathway designated for receiving configuration information used to configure the central communication circuit for time-slot based communication over the respective network branches.

4. The apparatus of claim 1, further including a plurality of common wire-based pathways, each of which include at least two of the plurality of network devices directly connected thereto, and wherein each of the at least two of the plurality of network devices includes a circuit including a microcontroller and a input/output port through which the microcontroller communicates with one of the plurality of common wire-based pathways.

5. The apparatus of claim 1, wherein at least two of the plurality of network devices are directly connected to a common wire-based pathway of said one of the network branches from which said communication is received, a first of the at least two network devices being said one of the plurality of network devices from which the communication is received, and a second of the at least two of network devices being another of the plurality of network devices assigned to communicate with the central communication circuit using a time slot that is different than the time slot used by the first network device, and wherein each of the at least two of the plurality of network devices includes a circuit including a microcontroller and a input/output port through which the microcontroller communicates with the common wire-based pathway.

6. The apparatus of claim 1, wherein the data-logic circuitry is configured and arranged to forward the received communications to the other network devices or block dissemination of further communications by, for each time cycle having a plurality of time slots, forwarding communications received during time slots not assessed as being error-indicative, not forwarding future communications received during time slots for which at least one received communication has been designated as being error-indicative, and for time slots designated as being error-indicative, resuming forwarding communications during the time slots in response to detecting recovery from error-indicative communications via the communication of data not assessed as being error-indicative.

7. The apparatus of claim 6, wherein the data-logic circuitry is configured and arranged to detect recovery from error-indicative communications by detecting the communication of a threshold number of sets of data communicated during different time slots that are not assessed as being error-indicative.

8. The apparatus of claim 1, wherein the data-logic circuitry is configured and arranged to assess the received communication as being error-indicative or not error-indicative based upon at least one of: a number of errors occurring on the time slot in which the communication is received, a type of error occurring, and a number of errors received from said one of the plurality of network devices on different time slots assigned to said one of the network devices via the central-communication schedule.

9. For use in a wired communication network including a plurality of network branches each having a common communication link and a plurality of network devices connected to the network branches, an apparatus comprising:
 a circuit for communicating a plurality of time-slot communication schedules for storage and access by each of the network devices, the plurality of time-slot communication schedules designating time slots assigned to each network device for communication over an associated one of the plurality of network branches;
 a stored central-communication schedule;
 data-coupling circuitry configured and arranged for communicatively coupling data between each of the plurality of network devices through respective ones of the plurality of network branches; and
 data-logic circuitry configured and arranged to
  receive a communication from one of the plurality of network devices connected to one of the network branches using a time slot assigned for the communication in the central-communication schedule,
  assess the received communication as being error-indicative or not error-indicative irrespective of an interpretation of any content carried by a received data, and
  in response thereto, either forward the received communications to the other network devices or block dissemination of further communications which would use the time slot associated with the received communication assessed as being error-indicative while permitting communication using other time slots on the branch common to the error-indicative time slot.

10. The apparatus of claim 9, wherein the common communication link in each branch is a common wire-based pathway to which the network devices in the branch and the data-coupling circuitry are directly connected, said one of the network branches having first and second ones of the network devices, the first one of the network devices being said one of the plurality of network devices from which the communication is received, and the second network device being another of the plurality of network devices assigned to communicate on the branch using a time slot that is different than the time slot used by said one of the plurality of network devices from which the communication is received.

11. The apparatus of claim 9, further including a plurality of input/output ports connected to and for communicating over the respective network branches, and wherein the plurality input/output ports includes a communication pathway designated for receiving configuration information used to configure the data-logic circuitry for time-slot based communication over the respective network branches.

12. The apparatus of claim 9, wherein the common communication link is a common wire-based pathway, and where each common wire-based pathway directly connects to at least two of the plurality of network devices and the data-coupling circuitry, the data-coupling circuitry being configured and arranged for communication to each of the at least two of the plurality of network devices on a common network branch over two different time slots.

13. The apparatus of claim 9, wherein at least two of the plurality of network devices and the data-coupling circuitry are directly connected to a common wire-based pathway of said one of the network branches from which said communication is received, a first of the at least two network devices being said one of the plurality of network devices from which the communication is received, and a second of the at least two of network devices being another of the plurality of network devices assigned to communicate using a time slot that is different that the time slot used by the first network device, the data-logic circuitry being configured and arranged to forward received communications from the first of the at least two network devices while not forwarding received communications from the second of the at least two network devices for communications received during different time slots in a common communication cycle.

14. The apparatus of claim 9, wherein the data-logic circuitry is configured and arranged to forward the received communications to the other network devices or block dissemination of further communications by, for each time cycle having a plurality of time slots, forwarding communications received during time slots not assessed as being error-indicative, not forwarding all future communications received during time slots for which at least one received communication has been designated as being error-indicative, and for time slots designated as being error-indicative, resuming forwarding communications during the time slots in response to detecting recovery from error-indicative communications via the communication of data not assessed as being error-indicative.

15. The apparatus of claim 14, wherein the data-logic circuitry is configured and arranged to detect recovery from error-indicative communications by detecting the communication of a threshold number of sets of data communicated during different time slots that are not assessed as being error-indicative.

16. The apparatus of claim 9, wherein the data-logic circuitry is configured and arranged to assess the received communication as being error-indicative or not error-indicative based upon at least one of: a number of errors occurring on the time slot in which the communication is received, a type of error occurring, and a number of errors received from said one of the plurality of network devices on different time slots assigned to said one of the network devices via the central-communication schedule.

17. For use in a wired communication network including a plurality of network branches each having a common communication link and a plurality of network devices connected to the network branches, a method comprising:
  communicating a plurality of time-slot communication schedules for storage and access by each of the network devices, the plurality of time-slot communication schedules designating time slots assigned to each network device for communication over an associated one of the plurality of network branches;
  storing a central-communication schedule;
  communicatively coupling data between each of the plurality of network devices through respective ones of the plurality of network branches; and
  in data-logic circuitry,
    receiving a communication from one of the plurality of network devices connected to one of the network branches using a time slot assigned for the communication in the central-communication schedule,
    assessing the received communication as being error-indicative or not error-indicative irrespective of an interpretation of any content carried by a received data, and
    in response thereto, either forwarding the received communications to the other network devices or blocking dissemination of further communications, which would use the time slot associated with the received communication assessed as being error-indicative while permitting communication using other time slots on the branch common to the error-indicative time slot.

18. The method of claim 17, wherein
  receiving a communication from one of the plurality of network devices connected to one of the network branches using a time slot assigned for the communication in the central-communication schedule includes receiving the communication from one of at least two of the plurality of network devices directly connected to a common wire-based pathway of said one of the network branches from which said communication is received, a first of the at least two network devices being said one of the plurality of network devices from which the communication is received, and a second of the at least two network devices being another of the plurality of network devices assigned to communicate using a time slot that is different than the time slot used by the first network device, and
  wherein either forwarding the received communications to the other network devices or blocking dissemination of further communications includes forwarding received communications from the first of the at least two network devices and while not forwarding received communications from the second of the at least two network devices for communications received during different time slots in a common communication cycle, in response to communications received during one of the different time slots being error-indicative.

19. The method of claim 17, wherein either forwarding the received communications to the other network devices or blocking dissemination of further communications, which would use the time slot includes forwarding communications received during time slots not assessed as being error-indicative, and not forwarding communications received during time slots assessed as being error-indicative, and for time slots designated as being error-indicative, resuming forwarding communications during the time slots in response to detecting recovery from error-indicative communications via the communication of data not assessed as being error-indicative.

20. The method claim 19, wherein detecting recovery from error-indicative communications includes detecting the communication of a threshold number of sets of data communicated during different time slots that are not assessed as being error-indicative.

* * * * *